US011900726B2

(12) United States Patent
Chen et al.

(10) Patent No.: US 11,900,726 B2
(45) Date of Patent: Feb. 13, 2024

(54) PICTURE PROCESSING METHOD AND APPARATUS, DEVICE, AND STORAGE MEDIUM

(71) Applicant: Beijing Bytedance Network Technology Co., Ltd., Beijing (CN)

(72) Inventors: Guanghui Chen, Beijing (CN); Yitian Xu, Beijing (CN); Li Zou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/091,099

(22) Filed: Dec. 29, 2022

(65) Prior Publication Data

US 2023/0133921 A1 May 4, 2023

Related U.S. Application Data

(63) Continuation of application No. PCT/CN2021/114945, filed on Aug. 27, 2021.

(30) Foreign Application Priority Data

Aug. 31, 2020 (CN) .......................... 202010899302.2

(51) Int. Cl.
*G06V 40/16* (2022.01)
*G06V 10/25* (2022.01)
(Continued)

(52) U.S. Cl.
CPC ............ *G06V 40/172* (2022.01); *G06V 10/25* (2022.01); *G06V 10/761* (2022.01); *H04N 5/2628* (2013.01)

(58) Field of Classification Search
CPC .... G06V 40/172; G06V 10/25; G06V 10/761; H04N 5/2628
See application file for complete search history.

(56) References Cited

U.S. PATENT DOCUMENTS 7,065,249 B2 * 6/2006 Fushiki ................... G06T 11/60
382/167
8,274,529 B1 * 9/2012 Butler ................... G06F 40/103
345/619
(Continued)

FOREIGN PATENT DOCUMENTS

| CN | 101021899 A | 8/2007 |
| CN | 105488784 A | 4/2016 |

(Continued)

OTHER PUBLICATIONS

International Search Report issued in International Patent Application No. PCT/CN2021/114945 dated Nov. 18, 2021.

*Primary Examiner* — Aaron W Carter
(74) *Attorney, Agent, or Firm* — ARENTFOX SCHIFF LLP

(57) ABSTRACT

An image processing method and apparatus, a device, and a storage medium are provided. Said method comprises: performing face recognition on a target image, in response to a processing trigger operation for the target image; determining a first portrait area corresponding to a first face in the target image, wherein the first portrait area comprises a portrait corresponding to the first face; sending the first portrait area to a first target user corresponding to the first portrait area; and receiving a first edited portrait area returned after the first target user performing online editing on the first portrait area, and synthesizing the first edited portrait area into the target image.

15 Claims, 2 Drawing Sheets

(51) Int. Cl.
 *G06V 10/74* (2022.01)
 *H04N 5/262* (2006.01)

(56) References Cited

U.S. PATENT DOCUMENTS

| | | | | |
|---|---|---|---|---|
| 9,286,706 | B1* | 3/2016 | Krishnaswamy | G06V 40/172 |
| 9,330,301 | B1* | 5/2016 | Ozog | G06V 20/20 |
| 10,032,259 | B2* | 7/2018 | Deluca | G06V 20/30 |
| 10,545,631 | B2* | 1/2020 | Ubillos | G06F 3/04847 |
| 2011/0231766 | A1* | 9/2011 | Chao | H04N 1/387 |
| | | | | 715/810 |
| 2013/0163814 | A1* | 6/2013 | Takiguchi | G06V 40/172 |
| | | | | 382/103 |
| 2013/0235068 | A1* | 9/2013 | Ubillos | G06T 11/001 |
| | | | | 345/594 |
| 2013/0235076 | A1* | 9/2013 | Cherna | G06F 3/167 |
| | | | | 345/650 |
| 2014/0063047 | A1* | 3/2014 | Johnson | G09G 5/028 |
| | | | | 345/593 |
| 2018/0198982 | A1* | 7/2018 | Lee | H04N 23/698 |
| 2021/0103717 | A1* | 4/2021 | Portal | G06V 10/751 |
| 2022/0383451 | A1* | 12/2022 | Chen | G06T 11/60 |

FOREIGN PATENT DOCUMENTS

| | | | |
|---|---|---|---|
| CN | 107895140 | A | 4/2018 |
| CN | 108229389 | A | 6/2018 |
| CN | 109308726 | A | 2/2019 |
| CN | 109712082 | A | 5/2019 |
| CN | 110047053 | A | 7/2019 |
| CN | 110222567 | A | 9/2019 |
| CN | 110377574 | A | 10/2019 |
| CN | 112036310 | A | 12/2020 |

* cited by examiner

US 11,900,726 B2

PICTURE PROCESSING METHOD AND APPARATUS, DEVICE, AND STORAGE MEDIUM

This application is a continuation application of International Application No. PCT/CN2021/114945, filed on Aug. 27, 2021, which claims priority to Chinese Patent Application No. 202010899302.2, titled "PICTURE PROCESSING METHOD AND APPARATUS, DEVICE, AND STORAGE MEDIUM", filed on Aug. 31, 2020 with the China National Intellectual Property Administration (CNIPA), both of which are incorporated herein by reference in their entireties.

FIELD

The present disclosure relates to the field of data processing, and in particular, to an image processing method, apparatus, device, and storage medium.

BACKGROUND

Since people have different concerns about image processing, when a same image is processed by different people, there may usually have different results.

Therefore, how to realize an image processing that ensures a target user's satisfaction with the effect of the image processing is a technical problem to be solved urgently at present.

SUMMARY

In order to solve the above technical problems or at least partially solve the above technical problems, an image processing method, apparatus, device and storage medium are provided in the present disclosure, so as to ensure a target user's satisfaction with the effect of the image processing.

In a first aspect, an image processing method is provided in the present disclosure. The method includes:
  performing face recognition on a target image, in response to a processing trigger operation for the target image;
  determining a first portrait area corresponding to a first face in the target image, the first portrait area including a portrait corresponding to the first face;
  sending the first portrait area to a first target user corresponding to the first portrait area; and
  receiving a first edited portrait area returned after the first target user performing online editing on the first portrait area, and synthesizing the first edited portrait area into the target image.
In an embodiment, the method further includes:
determining a second portrait area corresponding to a second face in the target image, the second portrait area includes a portrait corresponding to the second face; and
sending the second portrait area to a second target user corresponding to the second portrait area;
the receiving the first edited portrait area returned after the first target user performing online editing on the first portrait area, and synthesizing the first edited portrait area into the target image includes:
receiving the first edited portrait area returned after the first target user performing online editing on the first portrait area, and receiving a second edited portrait area returned after the second target user performing online editing on the second portrait area; and
synthesizing the first edited portrait area and the second edited portrait area into the target image.
In an embodiment, the method further includes:
calculating a similarity between pre-stored portrait information of an initial user and the first portrait area; and
determining whether the initial user is the first target user corresponding to the first portrait area, according to the similarity between the portrait information of the initial user and the first portrait area.
In an embodiment, the method further includes:
sending the first portrait area to all users in a preset user list; and
determining, in response to one of the users selecting the first portrait area, the user as the first target user corresponding to the first portrait area.
In an embodiment, the method further includes:
sending the target image to the first target user.
In an embodiment, the method further includes:
zooming in on the first portrait area for the first target user on an image editing interface, in order that the first target user performs perform the online editing operation on the first portrait area to acquire the first edited portrait area corresponding to the first portrait area.
In an embodiment, before zooming in on the first portrait area for the first target user on the image editing interface, the method further includes:
displaying a zoom-in control corresponding to the first portrait area for the first target user;
  the zooming in on the first portrait area for the first target user on the image editing interface includes:
zooming in on the first portrait area for the first target user on the image editing interface, in response to a triggering operation on the zoom-in control by the first target user.

In a second aspect, an image processing apparatus is provided in the present disclosure. The apparatus includes:
  a face recognition module, configured to perform face recognition on a target image, in response to a processing trigger operation for the target image;
  a first determination module, configured to determine a first portrait area corresponding to a first face in the target image, the first portrait area including a portrait corresponding to the first face;
  a first sending module, configured to send the first portrait area to the first target user; and
  a synthesis module, configured to receive a first edited portrait area returned after the first target user performing online editing on the first portrait area, and synthesize the first edited portrait area into the target image.

In a third aspect, an image processing system is further provided in the present disclosure. The system includes a first client and a second client;
  the first client is configured to perform face recognition on a target image, in response to a processing trigger operation for the target image, determine a first portrait area corresponding to a first face in the target image, and send the first portrait area to a first target user corresponding to the first portrait area, the first portrait area including a portrait corresponding to the first face;
  the second client is configured to receive the first portrait area, perform online editing on the first portrait area to acquire a first edited portrait area, and return the first edited portrait area to the first client, in order that the first client synthesizes the first edited portrait area into the target image.
In an embodiment, the system further includes a third client;

the first client is further configured to determine a second portrait area corresponding to a second face in the target image, and send the second portrait area to a second target user corresponding to the second portrait area;

the third client is configured to receive the second portrait area, perform online editing on the second portrait area to acquire a second edited portrait area, and return the second edited portrait area to the first client, in order that the first client synthesizes the second edited portrait area into the target image.

In a fourth aspect, a computer-readable storage medium is provided in the present disclosure. The computer-readable storage medium stores instructions which, when being executed on a terminal device, cause the terminal device to implement the above method.

In a fifth aspect, a device is provided in the present disclosure. The device includes: a memory, a processor, and a computer program stored in the memory and executable on the processor. The processor when executing the computer program, implements the above method.

Compared with the conventional technology, the technical solutions provided by the embodiments of the present disclosure have the following advantages.

In an image processing method according to an embodiment of the present disclosure, face recognition is first performed on a target image in response to a processing trigger operation for the target image, and a first portrait area corresponding to a first face in the target image is determined; and then, the first portrait area is sent to a first target user corresponding to the first portrait area, for the first target user performing online editing on the first portrait area to acquire a first edited portrait area; finally, the first edited portrait area is synthesized into the target image, and the processing of the target image is completed. In the present disclosure, since the first portrait area corresponding to the first face in the target image is edited online by the first target user corresponding to the first portrait area, at least the target user's satisfaction with the effect of the processed target image can be ensured.

In addition, with the embodiments of the present disclosure, different portrait areas in the target image are distributed to different target users for processing, which improves an overall efficiency of image processing while ensuring the target users' satisfaction with the effect of the image processing.

BRIEF DESCRIPTION OF THE DRAWINGS

Accompanying drawings, which are incorporated in and constitute a part of this specification, illustrate embodiments consistent with the present disclosure and together with the description serve to explain the principles of the present disclosure.

In order to more clearly illustrate technical solutions in embodiments of the present disclosure or in the conventional technology, the accompanying drawings to be used in the description of the embodiments or the conventional technology will be briefly introduced below. In other words, other drawings may also be obtained by the skilled in the art from these drawings without creative efforts.

DETAILED DESCRIPTION OF EMBODIMENTS

In order to more clearly understand the above objects, features and advantages of the present disclosure, the solutions of the present disclosure will be further described below. It should be noted that the embodiments of the present disclosure and features in the embodiments may be combined with each other if there is no conflict.

Many specific details are set forth in the following description to facilitate a full understanding of the present disclosure, but there are other ways different from those described herein to implement the present disclosure. Obviously, the embodiments in the specification are only a part rather than all of embodiments of the present disclosure.

Since people have different concerns about image processing, how to improve a target user's satisfaction with an image processing effect is a technical problem that needs to be solved urgently at present.

To this end, an image processing method is provided in the present disclosure. Face recognition is first performed on a target image, in response to a processing trigger operation for the target image. A first portrait area corresponding to a first face in the target image is determined. Then, the first portrait area is sent to a first target user corresponding to the first portrait area, for the first target user performing online editing on the first portrait area to acquire a first edited portrait area. Finally, the first edited portrait area is synthesized into the target image, and the processing of the target image is completed.

In the present disclosure, since the first portrait area corresponding to the first face in the target image is edited online by the first target user corresponding to the first portrait area, the first target user's satisfaction with the processed target image can be ensured to the greatest extent.

Moreover, in practice, people have different concerns about image processing. Especially for a group photo, people may pay more attention to themselves in the group photo. Therefore, when retouching a group photo, people usually focus on their own parts, while ignoring other people in the group photo. If the retouching is performed offline in a way that each person in the group photo processes on his own part in turn, each person's satisfaction with the effect of the group photo can be ensured to the greatest extent, but the time-consuming processing on the group photo reduces the efficiency of the image processing.

To this end, different portrait areas in the group photo are distributed to different target users for processing, which improves an overall efficiency of image processing while ensuring the target users' satisfaction with the processing effect of the group photo.

Figure 1:
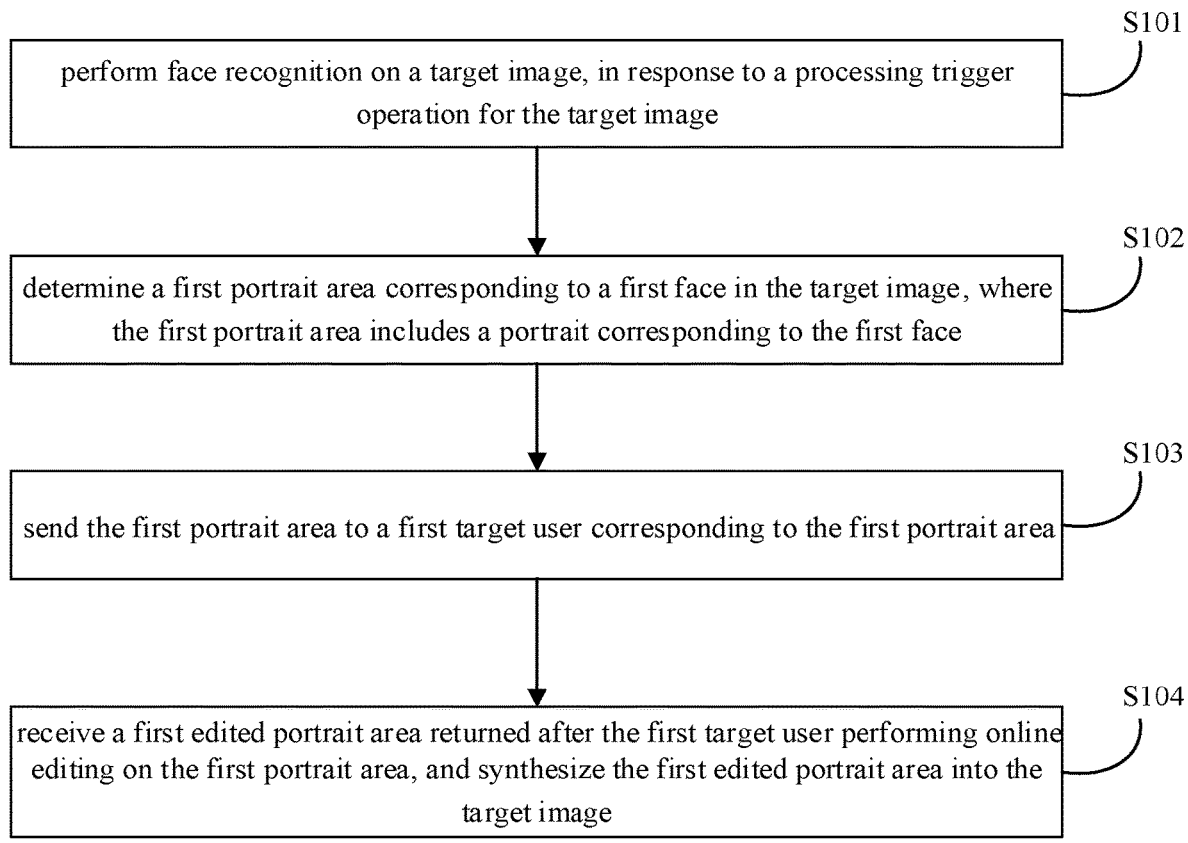
FIG. 1 is a flowchart of an image processing method according to an embodiment of the present disclosure.

In view of the above, an image processing method is provided in an embodiment of the present disclosure. FIG. 1 is a flowchart of an image processing method according to an embodiment of the present disclosure. Referring to FIG. 1, the method includes the following steps S101 to S104.

In S101, face recognition is performed on a target image, in response to a processing trigger operation for the target image.

In an embodiment of the present disclosure, the target image may be an image including person(s). Specifically, the target image may be a single-person image or a group photo of multiple people.

In an embodiment, the target image may be an image uploaded by any user. Specifically, after receiving the image uploaded by the user, the image is determined as the target image and meanwhile processing operation for the target image is triggered. Then, face recognition is performed on the target image.

In an embodiment, the target image may be an image selected by a user among multiple pre-stored images. Specifically, when the multiple pre-stored images are displayed to the user, the user's selection operation on any image is received, and an image selected by the selection operation is determined as the target image. Meanwhile the processing operation for the target image is triggered, and then face recognition is performed on the target image.

In practice, after face recognition is performed on the target image, position information of each face in the target image may be determined. For example, the position information of each face may be position information of a rectangular box including the face.

In S102, a first portrait area corresponding to a first face in the target image is determined. The portrait area includes a portrait corresponding to the first face.

In an embodiment of the present disclosure, after performing face recognition on the target image and determining the position information of the first face in the target image, the first portrait area corresponding to the first face in the target image is determined based on the position information of the first portrait area.

The effect processing on the target image includes not only the effect processing on the face in the target image, but also the effect processing on other body parts except the face in the target image, for example, also includes the effect processing on the slenderness of legs, the effect processing on waist thickness, or the like. Therefore, in the embodiment of the present disclosure, after recognizing the first face in the target image, the first portrait area including the first face is further determined, so as to meet the user's requirement for effect processing of various body parts in the target image.

In an embodiment, after performing face recognition on the target image and determining the position information of the first face, a rectangular area including the portrait corresponding to the first face may be determined based on the position information of the first face. The rectangular area serves as the first portrait area corresponding to the first face.

Specifically, the size of the face may be determined according to the position information of the face, and then the size of the entire human body corresponding to the size of the face is calculated based on pre-statistical human body proportion, that is, the proportion of the face to the entire human body. Then, a rectangular area including the entire human body is further determined based on the position information of the face, to finally acquire a portrait area corresponding to the face.

In S103, the first portrait area is sent to a first target user corresponding to the first portrait area.

In an embodiment of the present disclosure, after determining the portrait area corresponding to the first face in the target image, the first target user corresponding to the first portrait area is determined, and then the first portrait area is sent to the corresponding first target user, for the first target user performing online editing on the received first portrait area to realize effect processing of the first portrait area.

In an embodiment of the present disclosure, after the first target user corresponding to the first portrait area is determined, the first portrait area is sent to the corresponding first target user. In order to facilitate the first target user to control the effect of the first portrait area in the entire target image, the target image may also be sent to the first target user in an embodiment of the present disclosure.

The determining of the first target user corresponding to the first portrait area will be specifically introduced in the following embodiment.

In an embodiment, after the first target user corresponding to the first portrait area is determined, the first portrait area and the entire target image are both sent to the first target user corresponding to the first portrait area, so that the first target user can perform the online editing on the first portrait area by considering the target image and control the effect of the first portrait area in the entire target image.

In S104, a first edited portrait area returned after the first target user performs online editing on the first portrait area is received, and the first edited portrait area is synthesized into the target image.

In an embodiment of the present disclosure, after receiving the first portrait area, the first target user performs online editing on the first portrait area, and returns the first edited portrait area, to complete the edit operation on the first portrait area.

In an embodiment, after the first target user performs online editing on the first portrait area and acquires the first edited portrait area, the first target user may click on a save button for the first edited portrait area, to trigger the upload of the first edited portrait area.

In an embodiment, when the first edited portrait area uploaded by the first target user is received, the first edited portrait area is synthesized into the target image, so as to complete the processing of the first portrait area in the target image.

In practice, after receiving the first edited portrait area, position information of the first edited portrait area in the target image is determined, and then the first edited portrait area is synthesized into the target image based on the position information. The position information of the first edited portrait area on the target image may be position information carried in the first portrait area sent the first target user.

In an image processing method according to an embodiment of the present disclosure, face recognition is first performed on a target image in response to a processing trigger operation for the target image, and a first portrait area corresponding to a first face in the target image is determined; and then, the first portrait area is sent to a first target user corresponding to the first portrait area, for the first target user performing online editing on the first portrait area to acquire a first edited portrait area; finally, the first edited portrait area is synthesized into the target image, and the processing of the target image is completed.

In the present disclosure, since the first portrait area corresponding to the first face in the target image is edited online by the first target user corresponding to the first portrait area, the first target user's satisfaction with the processed target image can be ensured to the greatest extent.

In an application scenario, the target image may be a group photo of multiple people. In an embodiment of the present disclosure, after recognizing multiple faces in the target image, a first portrait area corresponding to a first face and a second portrait area corresponding to a second face may be determined respectively. Then the first portrait area and the second portrait area are respectively sent to corresponding target users, namely a first target user and a second target user. Then the first portrait area is edited online by the first target user, and the second portrait area is edited online by the second target user. Finally, the edited portrait areas are synthesized into the target image to complete the processing of the target image.

Specifically, on the basis of the above embodiments, the method may further include the following steps.

First, the second portrait area corresponding to the second face in the target image is determined. The second portrait area includes a portrait corresponding to the second face. Then, the second portrait area is sent to the second target user corresponding to the second portrait area. Finally, after receiving the first edited portrait area returned after the first target user performs online editing on the first portrait area, and the second edited portrait area returned after the second target user performs online editing on the second portrait area, the first edited portrait area and the second edited portrait area are respectively synthesized into the target image.

In the embodiment of the present disclosure, multiple portrait areas in a group photo of multiple people are respectively sent to the corresponding target users, and the multiple portrait areas in the target image are edited online in parallel by the corresponding target users, which can improve the overall processing efficiency of the target image to a certain extent. Therefore, with the image processing method according to the embodiments of the present disclosure, the overall efficiency of image processing can be improved while ensuring the users' satisfaction with the image processing effect.

On the basis of the foregoing embodiments, the way of determining the first target user corresponding to the first portrait area is further provided in an embodiment of the present disclosure, and is specifically as follows.

In an embodiment, a similarity between pre-stored portrait information of an initial user and the first portrait area may be calculated, and then, it is determined whether the initial user is the first target user corresponding to the first portrait area, according to the similarity between the portrait information of the initial user and the first portrait area. Specifically, the user corresponding to the portrait information having the highest similarity to the first portrait area may be determined as the first target user corresponding to the first portrait area.

The portrait information may be a single-person image of the initial user, and portrait information having the highest similarity to the first portrait area is determined by calculating the similarity between the first portrait area and the pre-stored portrait information of the initial user. Then, the user corresponding to the first portrait information is determined as the first target user corresponding to the first portrait area.

In an embodiment, after the first portrait area in the target image is determined, the first portrait area may be sent to all users in a preset user list. Then, in response to any of the users selecting the first portrait area, the user is determined as the target user corresponding to the first portrait area.

Users in the preset user list may be users predetermined for the target image, for example, may be users respectively corresponding to faces included in the target image. As an example, the target image includes faces of three users A, B, and C, and then the three users A, B, and C may serve as the users in the preset user list corresponding to the target image. The first portrait area in the target image may be sent to each of the three users A, B, and C. Then, the user who has received the first portrait area selects whether to perform online editing on the first portrait area. In practice, after receiving any user's selection operation for the first portrait area, the user is determined as the first target user corresponding to the first portrait area.

Determining of the second target user corresponding to the second portrait area may be understood with reference to the above description, and details are not repeated here.

In practice, a user may select one or more portrait areas, that is, the target user and the portrait areas may have a one-to-one or one-to-many relationship. However, usually one portrait area can only correspond to one target user, that is, the portrait area can only be edited online by one target user, so as to avoid abnormality in the image synthesis caused by the processing of one portrait area by multiple target users.

Through the way of determining the first target user corresponding to the first portrait area according to the embodiments of the present disclosure, the corresponding first target user can be determined for the first portrait area in the target image, so that the first target user can perform online editing on the first portrait area, to finally complete the processing of the target image. It can be seen that in the present disclosure, the efficiency of image processing improve can be improved while ensuring the target user's satisfaction with the image processing effect.

Figure 2:
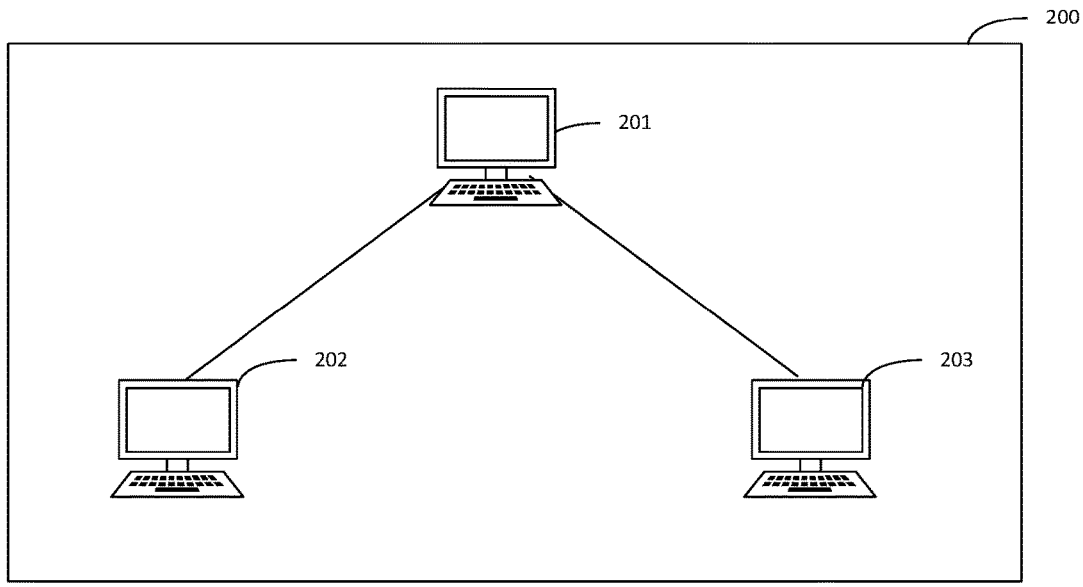
FIG. 2 is a schematic structural diagram of an image processing system according to an embodiment of the present disclosure.

In order to further understand the solution, an image processing system is further provided in an embodiment of the present disclosure. FIG. 2 is a schematic structural diagram of an image processing system according to an embodiment of the present disclosure. Referring to FIG. 2, the system 200 includes a first client 201 and a second client 202.

The first client 201 is configured to perform face recognition on a target image, in response to a processing trigger operation for the target image, determine a first portrait area corresponding to a first face in the target image, and send the first portrait area to a first target user corresponding to the first portrait area. The first portrait area includes a portrait corresponding to the first face.

The second client 202 is configured to, after receiving the first portrait area, perform online editing on the first portrait area to acquire a first edited portrait area, and return the first edited portrait area to the first client, so that the first client synthesizes the first edited portrait area into the target image.

In an embodiment, the system 200 further includes a third client 203.

The first client 201 is further configured to determine a second portrait area corresponding to a second face in the target image, and send the second portrait area to a second target user corresponding to the second portrait area.

The third client 203 is configured to, after receiving the second portrait area, perform online editing on the second portrait area to acquire a second edited portrait area, and return the second edited portrait area to the first client, so that the first client synthesizes the second edited portrait area into the target image.

In an embodiment, the first client is further configured to calculate a similarity between pre-stored portrait information of an initial user and the first portrait area; and determine whether the initial user is the first target user corresponding to the first portrait area, according to the similarity between the portrait information of the initial user and the first portrait area.

In an embodiment, the first client is further configured to send the first portrait area to all users in a preset user list; and determine, in response to any of the users selecting the first portrait area, the user as a first target user corresponding to the first portrait area.

In an embodiment, the first client is further configured to send the target image to the first target user.

In an embodiment, the second client is further configured to zoom in on the first portrait area for the first target user on an image editing interface, so that the first target user can perform the online editing operation on the first portrait area.

In an embodiment, the second client is further configured to display a zoom-in control corresponding to the first portrait area for the first target user; zoom-in on the first portrait area for the first target user on the image editing interface, in response to a triggering operation of the zoom-in control by the first target user.

With the image processing system according to the embodiments of the present disclosure, an overall efficiency of image processing is improved while ensuring the target user's satisfaction with the image processing effect.

Figure 3:
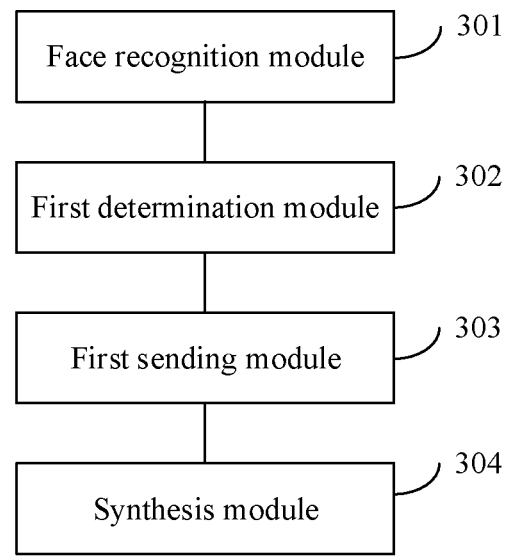
FIG. 3 is a schematic structural diagram of an image processing apparatus according to an embodiment of the present disclosure.

Based on the same inventive concept as the above method and system embodiments, an image processing apparatus is further provided in the present disclosure. FIG. 3 shows an image processing apparatus according to an embodiment of the present disclosure. Referring to FIG. 3, the apparatus includes: a face recognition module 301, a first determination module 302, a first sending module 303, and a synthesis module 304.

The face recognition module 301 is configured to perform face recognition on a target image, in response to a processing trigger operation for the target image.

The first determination module 302, configured to determine a first portrait area corresponding to a first face in the target image. The first portrait area includes a portrait corresponding to the first face.

The first sending module 303 is configured to send the first portrait area to a first target user corresponding to the first portrait area.

The synthesis module 304 is configured to receive a first edited portrait area returned after the first target user performing online editing on the first portrait area, and synthesize the first edited portrait area into the target image.

In an optional embodiment, the system further includes: a second determination module and a second sending module.

The second determination module is configured to determine a second portrait area corresponding to a second face in the target image. The second portrait area includes a portrait corresponding to the second face.

The second sending module is configured to send the second portrait area to a second target user corresponding to the second portrait area.

The synthesis module is specifically configured to:
receive the first edited portrait area returned after the first target user performing online editing on the first portrait area, and receive a second edited portrait area returned after the second target user performing online editing on the second portrait area; and synthesize the first edited portrait area and the second edited portrait area into the target image.

In an embodiment, the apparatus further includes:
a calculation module, configured to calculate a similarity between pre-stored portrait information of an initial user and the first portrait area; and
a third determination module, configured to determine whether the initial user is the first target user corresponding to the first portrait area, according to the similarity between the portrait information of the initial user and the first portrait area.

In an embodiment, the apparatus further includes:
a third sending module, configured to send the first portrait area to all users in a preset user list; and
a fourth determination module, configured to determine, in response to any one of the users selecting the first portrait area, the user as the first target user corresponding to the first portrait area.

In an embodiment, the device further includes:
a fourth sending module, configured to send the target image to the first target user.

In an embodiment, the apparatus further includes:
a first display module, configured to zoom in on the first portrait area for the first target user on an image editing interface, so that the first target user can perform the online editing operation on the first portrait area.

In an embodiment, the apparatus further includes:
a second display module, configured to display a zoom-in control corresponding to the first portrait area for the first target user.

The first display module is specifically configured to:
zoom in on the first portrait area for the first target user on the image editing interface, in response to a triggering operation of the zoom-in control by the first target user.

In the image processing apparatus according to the embodiment of the present disclosure, face recognition is performed on a target image in response to a processing trigger operation for the target image, and a first portrait area corresponding to a first face in the target image is determined; and then, the first portrait area is sent to a first target user corresponding to the first portrait area, for the first target user performing online editing on the first portrait area to acquire a first edited portrait area; finally, the first edited portrait area is synthesized into the target image, and the processing of the target image is completed. In the present disclosure, since the first portrait area corresponding to the first face in the target image is edited online by the first target user corresponding to the first portrait area, at least the target user's satisfaction with the effect of the processed target image can be ensured.

Moreover, in the embodiment of the present disclosure, multiple portrait areas are respectively sent to corresponding target users, and the multiple portrait areas in the target image are edited online in parallel by the corresponding target users, which can improve the overall processing efficiency of the target image to a certain extent.

Therefore, with the image processing apparatus according to the embodiments of the present disclosure, the overall efficiency of image processing can be improved while ensuring the user's satisfaction with the effect of image processing.

In addition to the above method, system, and apparatus, a computer-readable storage medium is further provided in an embodiment of the present disclosure. The computer-readable storage medium stores instructions which, when being executed on a terminal device, causes the terminal device to implement the image processing method described in the embodiments of the present disclosure.

Figure 4:
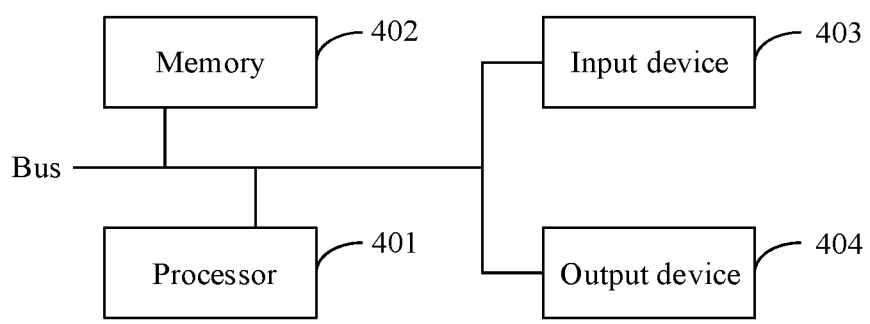
FIG. 4 is a schematic structural diagram of an image processing device according to an embodiment of the present disclosure.

In addition, an image processing device is further provided in an embodiment of the present disclosure. As shown in FIG. 4, the device may include: a processor 401, a memory 402, an input device 403 and an output device 404.

The number of processors 401 in the image processing device may be one or more, and one processor is taken as an example in FIG. 4. In some embodiments of the present invention, the processor 401, the memory 402, the input device 403 and the output device 404 may be connected by a bus or in other ways. The connection by a bus is taken as an example in FIG. 4.

The memory 402 may be used to store software programs and modules, and the processor 401 executes various functional applications and data processing of the above image processing device by running software programs and modules stored in the memory 402. The memory 402 may mainly include a program storage area and a data storage area. The program storage area may store an operating system, an application program required for at least one function, and the like. Additionally, the memory 402 may include a high-speed random access memory, and may also include a non-volatile memory, such as at least one magnetic disk storage device, flash memory device, or other volatile solid state storage device. The input device 403 may be used to receive input numerical or character information, and generate signal input related to user settings and function control of the image processing device.

Specifically in this embodiment, the processor 401 loads the executable files corresponding to the processes of one or more application programs into the memory 402 according to the following instructions, and the processor 401 executes the application programs stored in the memory 402, thus to realize various functions of the above image generation device.

It should be noted that, in this document, relational terms such as "first" and "second" etc. are only used to distinguish one entity or operation from another entity or operation, and do not necessarily require or imply there is such actual relationship or sequence between these entities or operations. Moreover, the terms "comprising", "comprises" or any other variation thereof are intended to encompass a non-exclusive inclusion such that a process, method, article or device that includes a list of elements includes not only those elements, but also includes other elements not explicitly listed, or elements inherent to such a process, method, article or apparatus. Without further limitation, an element defined by the phrase "comprising a . . . " does not preclude the presence of additional identical elements in a process, method, article or apparatus that includes the element.

The above descriptions are only specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments described herein, but is to be accorded the widest scope consistent with the principles and novel features disclosed herein.

The invention claimed is:

1. An image processing method, comprising:
performing face recognition on a target image, in response to a processing trigger operation for the target image;
determining a first portrait area corresponding to a first face in the target image, wherein the first portrait area comprises a portrait corresponding to the first face;
sending the first portrait area to all users in a preset user list;
determining, in response to any one of the users selecting the first portrait area, the user as a first target user corresponding to the first portrait area; and
receiving a first edited portrait area returned after the first target user performing online editing on the first portrait area, and synthesizing the first edited portrait area into the target image.

2. The method according to claim 1, further comprising:
determining a second portrait area corresponding to a second face in the target image, wherein the second portrait area comprises a portrait corresponding to the second face; and
sending the second portrait area to a second target user corresponding to the second portrait area;
the receiving the first edited portrait area returned after the first target user performing online editing on the first portrait area, and synthesizing the first edited portrait area into the target image comprises:
receiving the first edited portrait area returned after the first target user performing online editing on the first portrait area, and receiving a second edited portrait area returned after the second target user performing online editing on the second portrait area; and
synthesizing the first edited portrait area and the second edited portrait area into the target image.

3. The method according to claim 1, further comprising:
calculating a similarity between pre-stored portrait information of an initial user and the first portrait area; and
determining whether the initial user is the first target user corresponding to the first portrait area, according to the similarity between the portrait information of the initial user and the first portrait area.

4. The method according to claim 1, further comprising:
sending the target image to the first target user.

5. The method according to claim 1, further comprising:
zooming in on the first portrait area for the first target user on an image editing interface, in order that the first target user performs the online editing operation on the first portrait area.

6. The method according to claim 5, wherein before zooming in on the first portrait area for the first target user on the image editing interface, the method further comprises:
displaying a zoom-in control corresponding to the first portrait area for the first target user;
the zooming in on the first portrait area for the first target user on the image editing interface comprises:
zooming in on the first portrait area for the first target user on the image editing interface, in response to a triggering operation on the zoom-in control by the first target user.

7. An image processing system, wherein the system comprises a first client device comprising a first processor and a second client device comprising a second processor;
the first processor of the first client device is configured to, when executing instructions, perform face recognition on a target image, in response to a processing trigger operation for the target image, determine a first portrait area corresponding to a first face in the target image, and send the first portrait area to all users in a preset user list, determine, in response to any one of the users selecting the first portrait area, the user as a first target user corresponding to the first portrait area, wherein the first portrait area comprises a portrait corresponding to the first face; and
the second processor of the second client device is configured to, when executing instructions, receive the first portrait area, select the first portrait area, perform online editing on the first portrait area to acquire a first edited portrait area, and return the first edited portrait area to the first client device, in order that the first client device synthesizes the first edited portrait area into the target image.

8. The system according to claim 7, wherein the system further comprises a third client device comprising a third processor;
the first processor of the first client device is further configured to determine a second portrait area corresponding to a second face in the target image, and send the second portrait area to a second target user corresponding to the second portrait area; and
the third processor of the third client device is configured to receive the second portrait area, perform online editing on the second portrait area to acquire a second edited portrait area, and return the second edited portrait area to the first client device, in order that the first client device synthesizes the second edited portrait area into the target image.

9. A non-transitory computer-readable storage medium, wherein the computer-readable storage medium stores instructions which, when being executed on a terminal device, cause the terminal device to implement:
performing face recognition on a target image, in response to a processing trigger operation for the target image;
determining a first portrait area corresponding to a first face in the target image, wherein the first portrait area comprises a portrait corresponding to the first face;
sending the first portrait area to all users in a preset user list;
determining, in response to any one of the users selecting the first portrait area, the user as a first target user corresponding to the first portrait area; and
receiving a first edited portrait area returned after the first target user performing online editing on the first portrait area, and synthesizing the first edited portrait area into the target image.

10. A device, comprising: a memory, a processor, and a computer program stored in the memory and executable on the processor, wherein the processor, when executing the computer program, is configured to implement:
performing face recognition on a target image, in response to a processing trigger operation for the target image;
determining a first portrait area corresponding to a first face in the target image, wherein the first portrait area comprises a portrait corresponding to the first face;
sending the first portrait area to all users in a preset user list;
determining, in response to any one of the users selecting the first portrait area, the user as a first target user corresponding to the first portrait area; and
receiving a first edited portrait area returned after the first target user performing online editing on the first portrait area, and synthesizing the first edited portrait area into the target image.

11. The device according to claim 10, wherein the processor, when executing the computer program, is further configured to implement:
determining a second portrait area corresponding to a second face in the target image, wherein the second portrait area comprises a portrait corresponding to the second face; and
sending the second portrait area to a second target user corresponding to the second portrait area;
receiving the first edited portrait area returned after the first target user performing online editing on the first portrait area, and receiving a second edited portrait area returned after the second target user performing online editing on the second portrait area; and
synthesizing the first edited portrait area and the second edited portrait area into the target image.

12. The device according to claim 10, wherein the processor, when executing the computer program, is further configured to implement:
calculating a similarity between pre-stored portrait information of an initial user and the first portrait area; and
determining whether the initial user is the first target user corresponding to the first portrait area, according to the similarity between the portrait information of the initial user and the first portrait area.

13. The device according to claim 10, wherein the processor, when executing the computer program, is further configured to implement:
sending the target image to the first target user.

14. The device according to claim 10, wherein the processor, when executing the computer program, is further configured to implement:
zooming in on the first portrait area for the first target user on an image editing interface, in order that the first target user performs the online editing operation on the first portrait area.

15. The device according to claim 14, wherein the processor, when executing the computer program, is further configured to implement:
displaying a zoom-in control corresponding to the first portrait area for the first target user; and
zooming in on the first portrait area for the first target user on the image editing interface, in response to a triggering operation on the zoom-in control by the first target user.

* * * * *